(12) United States Patent
Mannarsamy

(10) Patent No.: US 7,073,093 B2
(45) Date of Patent: Jul. 4, 2006

(54) HELPDESK SYSTEM AND METHOD

(75) Inventor: Hariharakrishnan Mannarsamy, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 913 days.

(21) Appl. No.: 09/858,105

(22) Filed: May 15, 2001

(65) Prior Publication Data

US 2002/0174380 A1 Nov. 21, 2002

(51) Int. Cl.
*G06F 11/00* (2006.01)

(52) U.S. Cl. .......................... 714/25; 714/26; 714/33; 714/57; 705/16

(58) Field of Classification Search .................. 714/25, 714/57, 27, 26, 33; 705/16
See application file for complete search history.

(56) References Cited

U.S. PATENT DOCUMENTS

| 5,367,667 | A | * | 11/1994 | Wahlquist et al. | ........... 395/575 |
| 5,983,197 | A | * | 11/1999 | Enta | ............................ 705/16 |
| 6,604,141 | B1 | * | 8/2003 | Ventura | ...................... 709/227 |
| 2002/0112052 | A1 | * | 8/2002 | Brittingham et al. | ....... 709/224 |

* cited by examiner

*Primary Examiner*—Robert Beausoliel
*Assistant Examiner*—Joseph D Manoskey

(57) ABSTRACT

A remote central helpdesk for a plurality of POS appliances includes a diagnostics engine which, on input of a reported problem, executes a series of manual and automated queries in a sequence determined by a decision tree and by the answers to the queries. The diagnostics engine displays the queries on a display, and prompts the helpdesk operator to answer those queries which require a manual input. Automatic queries are executed by the helpdesk computer which interrogates the POS appliance for any necessary data. The diagnostics engine makes the problem-solving visible to the helpdesk operator, and helps the operator to understand their job and the possible reasons why problems might occur.

10 Claims, 2 Drawing Sheets

HELPDESK SYSTEM AND METHOD

FIELD OF INVENTION

The present invention relates to a helpdesk system and method for use in the remote diagnosis, and, if possible, correction of problems encountered in POS (Point of Sale) appliances using a central helpdesk.

BACKGROUND OF INVENTION

A POS (Point of Sale) appliance is an EDC (Electronic Data Capture) terminal that a merchant uses at the time and place of a transaction to capture purchaser information from credit cards, debit cards, smart cards, and the like.

It may include a cash register, a bar code reader, an optical scanner, a magnetic stripe reader or the like, and may be on-line to a central computer for, for example, credit checking and inventory updating.

Examples of POS appliances include those supplied by Verifone as the TXO™ and Verix™ terminals.

A support system for the users of POS appliances may include a central help desk, remote from the appliances, to which problems with the appliances can be reported.

A current approach to diagnosing reported problems is to have a set of queries on the central help desk computer which are categorised under a number of headings. These categories may for example include a "Printer Problems" category, a "Card Reader Problems" category, a "Host Communication Problem" category, an "Application Configuration" category, and the like.

A "Printer Problems" category might include a "printer out of paper?" query. A "Host Communication Problem" category might include queries such as "Host phone number not OK?", "Is external modem supported?", or "Modem initialisation string?". An "Application Configuration" category might include queries such as "Are application and operating system compatible?", "Is transaction supported?", and "Are card types supported?".

In use, the helpdesk operator will chose a query from the various query categories which the operator feels may be likely to reveal the problem, and the help desk computer will execute the query by interrogating the POS appliance for the necessary information. The result is then provided to the helpdesk operator. If it does not reveal the problem, the operator selects a further query, and continues in this manner until hopefully the fault is revealed.

A problem with such a helpdesk system is that it is not particularly user-friendly in respect of the helpdesk operator, as it does not help the operator to understand the different steps involved in a diagnosis. The operator just goes through a list of possible queries, and continues until hopefully the error is found. An inexperienced helpdesk operator may not know where or how to start with a diagnosis, and may have difficulty in determining which queries to ask and in what order.

An object of the present invention is to provide a more user-friendly and intuitive helpdesk system and method that allows a helpdesk operator to understand more fully the diagnostic stages involved in determining the problems associated with a POS appliance, and so better understand the different sources of problems that may be encountered.

SUMMARY OF INVENTION

According to a first aspect of the present invention, there is provided a remote diagnostics system for POS appliances, the system comprising a central control unit including a display and a memory, and a plurality of POS appliances remote from and serviced by the control unit; wherein the control unit includes in its memory a plurality of possible problems that may occur in the appliances, a plurality of diagnostic queries which may be answered either manually by an operator of the control unit or in an automated manner by the control unit, a plurality of diagnostic rules associated with each of the automated queries, each rule acting on data from the appliances to provide an answer to its associated query, and a decision tree for each of the problems, each decision tree relating various of the manual and automated queries with one another in accordance with the possible answers to the queries. The control unit also includes a diagnostics engine which, on selection of one of the problems, executes a series of the manual and automated queries in a sequence determined by the decision tree for that problem and by the answers to the queries, and displays the queries on the display, as well as prompting the operator to answer those queries which require a manual input.

A system in accordance with the present invention allows the route by which a diagnosis is made to be visible to the operator of the control unit, e.g. the helpdesk operator of a POS appliance service provider. It begins with an input of a problem associated with an appliance, rather than with a query, and from this point is able to take the operator systematically through a sequence of queries associated with the problem. It is able to diagnose the problem in a step-by-step manner, systematically solving the problem by eliminating different possibilities one by one, and is more user-friendly than the prior art mentioned above. It thereby helps the operator to learn their job as they work, bringing visibility to different sources of a reported problem.

A further important advantage is that the system allows for both manual and automated trouble-shooting to take place under the same framework. This contrasts with the prior art, which assumed no manual queries within its framework, and neither prompted the operator to provide such manual information nor incorporated such information in its procedures. Thus, in the present invention, the operator is able to incorporate manually obtained information into the diagnosis. This information may be obtained, for example, by the operator telephoning the merchant, and a query might be for example whether or not the telephone line is connected to the correct communications port in the POS appliance (in the prior art such a situation may merely have been assumed by the control unit, as it might not have had the intelligence to test the proposition).

Another advantage is that the whole decision tree can be configured and stored in the system and can be executed without having to 'hard-code' the sequences of diagnosis so that they cannot be modified. In accordance with the present invention, the various possible problems, the relationships between the queries, and the queries themselves may be easily varied or removed.

When the control unit displays a manual query, it preferably also displays a list of possible answers to the query from which the operator may choose, e.g. by selecting one of a number of radio buttons in a dialog box.

It is preferred that the answer to a query which is carried out automatically is displayed on the operator's display along with the query itself. This ensures full visibility of the diagnostic steps.

Further preferably, the automated queries are displayed on screen, e.g. in a dialog box, and are not executed until the operator has confirmed to proceed. Thus, the system does not simply execute automated queries but instead allows the operator to initiate the queries (e.g. by clicking on an 'execute' button in a dialog box). This provides the operator with a greater deal of control and interaction with the system, and allows them to more easily follow and learn the diagnostics procedure.

The information required to answer the automated queries may be obtained from the POS appliance under test, as and when needed during the diagnostic procedure.

The present system may provide for an automated query to be answered manually, if, for some reason, an interrogation of the POS appliance by the control unit was unable to obtain the information necessary to answer the query, or if for example the operator felt that a manual answer would be more appropriate or correct. Thus, when an automated query is provided on the control unit display, it may include an option to answer manually, in which case the control unit may display a number of possible answers to the query from which the operator may choose.

The diagnostic rules may be logical expressions which involve a number of "monitored items", and may return a Boolean value of either TRUE or FALSE. The "monitored items" comprise pre-defined data which is maintained by and may be captured from the remote appliances, such as the version of the operating system it uses or the version of an application run on the appliance. The definitions of these monitored items may be provided to the helpdesk as a file and may be defined by, for example, the operating system developer or the application developer. The monitored items may then be used to develop the queries and diagnostics rules.

The actual value of a monitored item for an appliance may be obtained as and when needed on execution of a query by interrogating the POS appliance and asking for values for the monitored items of interest.

Thus, a query such as "Is the application running on a compatible version of an Operating System?" may be associated with a diagnostic rule:

If (Application Version=1.0 and OS Version=3.0) OR
(Application Version=2.0 and OS Version=2.0)
Return FALSE
Else
Return TRUE.

In this example, the monitored items are "Application Version" and "OS Version".

The problems provided on the control unit may take any suitable form, and those of relevance may vary from appliance to appliance depending on their configuration. Possible problems may for example include "Transaction aborted", "Host communication failed", "Printer not printing receipt", "Transaction is stuck while card-swiped" and the like. These problems may be grouped into different categories for ease of location.

Viewed from a further aspect, the invention provides a method for the remote diagnosis of problems occurring in POS appliances, the method comprising the steps of:
  providing a central diagnostics unit remote from said POS appliances;
  importing definitions of monitored items as planned to be maintained on the POS appliances;
  defining a plurality of possible problems which may occur in the POS appliances;
  defining a plurality of manual and automated queries which may be used to diagnose the possible problems that may occur in the POS appliances;
  associating with each automated query a diagnostic rule which provides an answer to the associated query by acting on data, relating to one or more of the monitored items, associated with the POS appliance to be diagnosed;
  defining a decision tree for each of the possible problems, each said decision tree relating various of the manual and automated queries with one another in accordance with the possible answers to the queries; and
  providing a diagnostics engine which, for a said problem, executes the manual and automated queries of the decision tree of the problem on a display of the diagnostics unit in a sequence determined by the answers to the queries and in accordance with the relationships in the decision tree of the problem, and which prompts the operator to answer queries which require a manual input.

Viewed from a still further aspect, the invention provides a system for the remote diagnosis of problems occurring in a plurality of POS appliances by a remote central control unit provided with definitions as to data maintained by the POS appliances, wherein the control unit includes a diagnostics engine therein which displays a plurality of diagnostic queries to the operator of the control unit, the queries being answerable either manually by the operator or automatically by the control unit, and wherein the diagnostics engine displays the queries in an order specified by decision trees that relate the queries to one another based on the possible answers to each query and on the possible problems that might be encountered in the appliances, with the results of the queries being displayed both for the manual and automated queries, and with the automated queries only being answered on confirmation to proceed by the operator.

BRIEF DESCRIPTION OF DRAWINGS

The invention will hereinafter be described in greater detail by reference to the attached drawings which show an example form of the invention. It is to be understood that the particularity of the drawings does not supersede the generality of the preceding description of the invention.

DETAILED DESCRIPTION

Figure 1:
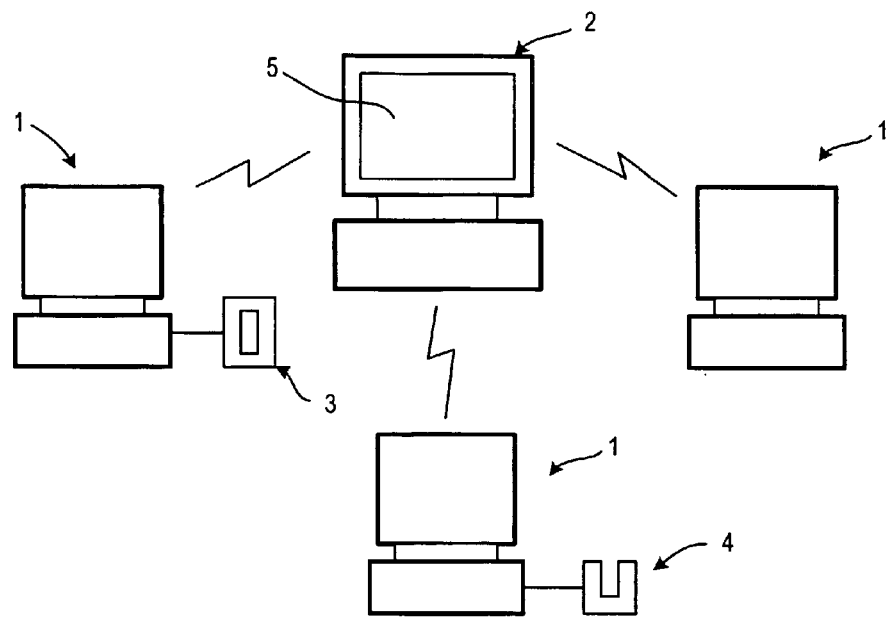
FIG. 1 is a schematic diagram of a system in accordance with one embodiment of the present invention.

Referring to FIG. 1, a number of POS (Point of Sale) appliances 1 are provided at various merchant sites. These are connected to a remote central control unit 2 of a service provider of the appliances 1 so as to keep track of the appliances 1 and to provide whatever support services are required.

The POS appliances 1 may take any form required by the merchants, and may include features such as a bar-code reader 3 and/or a credit card swipe machine 4. The appliances may for example allow the merchants to take payment for goods and services, authorise the use of a credit card, and/or keep an inventory of goods.

The control unit 2 will have a helpdesk application running on it for determining the causes of problems occurring on the appliances 1, and includes a screen 5 on which are displayed various diagnostic queries during the running of the helpdesk application.

When a problem occurs at one of the POS appliances 1, such as for example if the host communication of a payment transaction fails, the merchant contacts the service provider who will then attempt to find the reason for the fault in as timely a manner as possible.

In one embodiment, the merchant firstly telephones the help desk to report a fault. A helpdesk operator then provides the merchant with an "assignment-id" which is targeted to that particular helpdesk operator. The merchant then sends a diagnostic request through the appliance 1 to the control unit 2. The request contains the "assignment id" together with an identification of the appliance 1.

Figure 2:
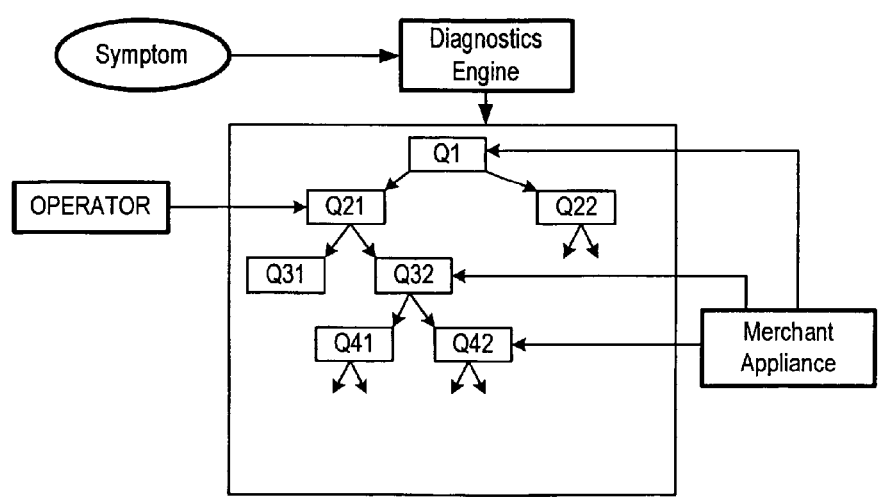
FIG. 2 is schematic diagram showing the operation of the central control unit.

Once the help desk receives the help request, the help desk operator processes the request by initiating a diagnostic engine utility of the helpdesk application, and continues in the manner shown schematically in FIG. 2.

Thus, the operator first feeds the symptom into the diagnostic engine. This may be done by selecting a symptom/problem from a list of symptoms/problems stored in the computer's memory and displayed on the screen 5. These symptoms may be placed in various suitable categories to facilitate their selection.

The choosing of a symptom initiates a series of queries (Q1, etc.) that should be asked in order to determine the cause of and solution to the problem.

These queries are stored in the control unit and are related to each other by means of a plurality of diagnostic trees that associate the queries with one another based on the various problems/symptoms which might be reported and on the possible answers to the queries which might arise. Thus, for each problem, a decision tree of queries is defined to attempt to diagnose the problem. Each decision tree will for example be structured so that a first query in the tree (Q1) is associated with two further queries (Q21, Q22), one for each of the possible answers to the first query (Q1). Two further queries are then associated with each of these queries (e.g. Q31 and Q32 for Q21), and so on. The queries are ordered so that they provide a logical path to the cause of the problem, allowing other causes to be eliminated through the answers given to them.

The queries may be manual queries, as in the case of Q21, that require the operator to provide the answer (for example by telephoning the merchant), or they may be automated queries, as in the case of Q1, Q32 and Q42, in which case the query is answered automatically by the diagnostics engine which interrogates the appliance 1 for the necessary data, and executes a diagnostic rule associated with that query.

A diagnostic rule is a logical expression that involves a number of "monitored items", and is used to act on data collected from the POS appliances to provide for example a Boolean value of either TRUE or FALSE, the data relating to the monitored items.

The monitored items define data which is intended to be maintained by and which may be captured from the remote appliances, such as the version of the operating system it uses or the version of an application run on the appliance. The definition of these monitored items may be provided to the helpdesk control unit as a file and may be defined by, for example, the operating system developer or the application developer. The monitored items may then be used to develop the queries and diagnostics rules.

The actual value of a monitored item for an appliance may be obtained as and when needed on execution of a query by interrogating the appliance 1 and asking for values for the monitored items of interest.

Thus, when the "monitored items" are the version of an application running on the appliance and the version of its operating system, a diagnostic rule may be the logical expression:

IF (Application Version=1.0 and OS Version=3.0) OR (Application Version=2.0 and OS Version=2.0)
Return FALSE Else
Return TRUE.

The diagnostics engine displays both the automated and manual queries as dialog boxes on the screen 5 used by the operator, and steps through the queries one by one. Each new query is chosen by the engine based on the results of the preceding query and in accordance with the relationships between the queries set by the decision tree for the particular problem at hand. This is continued until the end of a particular query path through the decision tree and, hopefully, to the resolution of the problem.

As the helpdesk operator is able to view the full diagnostics procedure step by step on their screen, the system brings visibility to the different sources of a problem, and allows the operator to build up experience and better learn the job. It also makes the diagnostic process more user-friendly.

Furthermore, the system allows for both manual and automated troubleshooting under the same framework, and allows for simple alteration of the system by e.g. altering the problems, decision tree and/or queries. It does not require the hard-coding of sequences of diagnosis.

Figure 3:
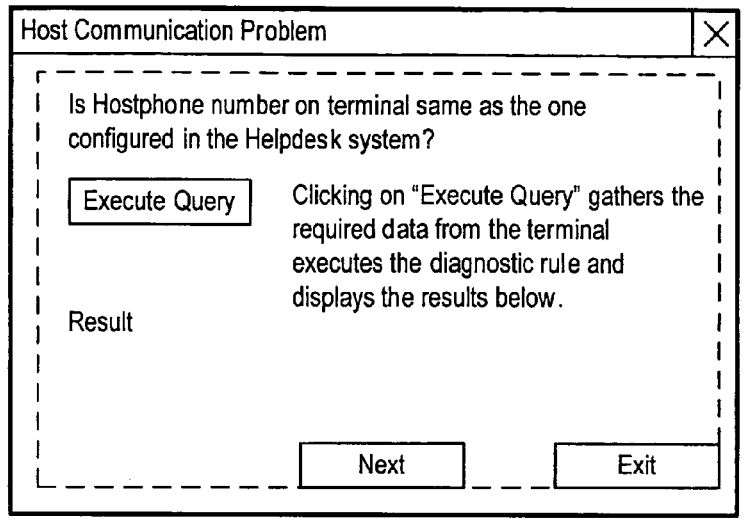
FIG. 3 is an example dialog box of an automated query which is answered by a helpdesk system.
Figure 4:
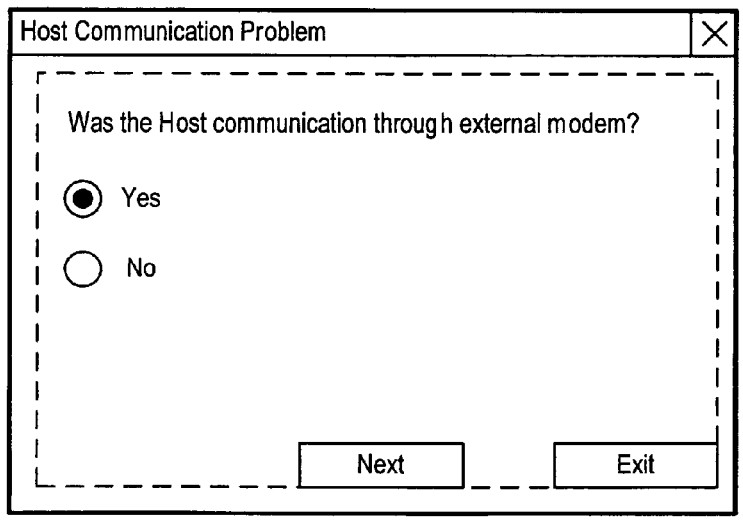
FIG. 4 is an example dialog box of a manual query which is answered by a helpdesk operator.

Typical dialog box displays which the diagnostics engine may produce are shown in FIGS. 3 and 4.

As can be seen in FIG. 3, when a query is automated it is still displayed on the screen. In this case, the query is "Is Host phone number on terminal the same as the one configured in the helpdesk system", and the monitored items will be the telephone numbers stored on the POS terminal and on the helpdesk system.

It should be noted that the automated query is only executed once the operator actually instigates it by clicking on the "execute query" button. This extra operator interaction again makes the diagnostics procedure more user-friendly and facilitates learning of the diagnostic steps involved.

Once the operator does press the "execute" button, the diagnostics engine will interrogate the appliance 1 for the data required to answer the query, and the result of the query is displayed in the dialog box.

After display of the result, the operator can choose to continue to the next query or can exit the procedure (for example because the underlying cause of the problem/symptom has been found through the result of the query).

FIG. 4 shows a dialog box in which the operator must manually insert an answer before moving to the next query. In the case shown, the query is "Was the host communication through an external modem", and the answer may be either "yes" or "no", the operator selecting either a "yes" or a "no" radio button in order to answer. Thus, the operator may telephone the merchant and obtain the necessary information by asking the merchant to check for an external modem or the like.

Again, after the result, the operator can choose to continue to the next query or can exit the procedure for example because the underlying cause has been found.

The diagnostics engine may also allow an automated query to be answered manually by the operator, for example in the case where an automated query fails or in the case where the operator believes that a manual answer would be preferable. Thus, the dialog box of FIG. 3 may include a further button e.g. entitled "Answer manually", and the pressing of this button may produce a new dialog box showing the various possible answers to the query for selection by the operator in a similar manner to the dialog box of FIG. 4.

It is to be understood that various alterations additions and/or modifications may be made to the parts previously described without departing from the ambit of the invention, and that, in the light of the teachings of the present invention, a programmer may implement the invention in software in a variety of manners.

In one possible alternative, the diagnostic rules may have more than two possible answers. Indeed, the queries and diagnostic rules may take any suitable forms.

The invention claimed is:

1. A remote diagnostics system for POS appliances, wherein said system comprises:
   a central control unit including a display and a memory; and
   a plurality of POS appliances remote from and serviced by said control unit;
   wherein said control unit includes therein:
   a plurality of problems which may occur on said appliances;
   a plurality of diagnostic queries which may be answered manually by a operator of the control unit or in an automated manner by said control unit;
   a plurality of diagnostic rules associated with each of the automated queries, each said rule acting on data obtained from said appliances to provide an answer to its associated query;
   a decision tree for each of said problems, each said decision tree relating various of said queries with one another in accordance with the possible answers to said queries; and
   a diagnostics engine which, on input of a said problem, executes a series of said queries in a sequence determined by the decision tree for said problem and by the answers to said queries, said diagnostics engine displaying said queries on said display, as well as prompting said operator to answer queries which require a manual input.

2. The system of claim 1, wherein said diagnostics engine displays the answers to said automated queries on the display of the control unit.

3. The system of claim 1, wherein the diagnostics engine requests the operator of the central control to confirm that an automated query should be executed before executing said automated query.

4. The system of claim 1, wherein the diagnostics engine provides the option of answering an automated query manually.

5. A method for the remote diagnosis of problems occurring in POS appliances, comprising the steps of:
   providing a central diagnostic unit remote from said POS appliances;
   importing definitions into said diagnostics unit of monitored items maintained by said POS appliances;
   defining a plurality of possible problems which may occur in said POS appliances;
   defining manual and automated queries which may be used to diagnose said possible problems;
   associating with each automated query a rule which provides an answer to its associated query by acting on data, relating to one or more of the monitored items, associated with the appliance to be diagnosed;
   defining a decision tree for each of said problems, each said decision tree relating various of the manual and automated queries with one another in accordance with the possible answers to said queries; and
   providing a diagnostics engine which, on input of a said problem, executes a series of said manual and automated queries in a sequence determined by the decision tree for said problem and by the answers to said queries, said diagnostics engine displaying said queries on a display of said central diagnostics unit, as well as prompting said operator to answer queries which require a manual input.

6. The method of claim 5, including the step of displaying the answers to the automated queries on the display of the diagnostics unit.

7. The method of claim 5, including the step of requesting confirmation from an operator before executing an automated query.

8. The method of claim 5, including the step of enabling the operator to answer an automated query manually.

9. A system for the remote diagnosis of problems occurring in a plurality of POS appliances by a remote central control unit which is provided with definitions as to data maintained by said POS appliances, wherein said control unit includes a diagnostics engine therein which displays a plurality of diagnostic queries to the operator of the control unit, the queries being answerable either manually by the operator or automatically by the control unit, and wherein the diagnostics engine displays said queries in an order specified by decision trees that relate the queries to one another based on the possible answers to each query and on the possible problems that might be encountered in the POS appliances, with the results of said queries being displayed both for the manual and automated queries, and with an automated query only being answered on confirmation by the operator to proceed.

10. A POS appliance helpdesk computer program product including a computer readable storage medium on which is provided POS appliance helpdesk computer software for conducting the remote diagnosis of a problem in a POS appliance from a central control unit, the software including:
   a plurality of problems which may occur in said POS appliance;
   a plurality of diagnostic queries which may be answered manually by an operator of the control unit or in an automated manner by said control unit;
   a plurality of diagnostic rules associated with each of the automated queries, each said rule acting on data obtained from said appliance to provide an answer to an associated query;
   a decision tree for each of said problems, each said decision tree relating various of said queries with one another in accordance with the possible answers to said queries; and
   a diagnostics engine which, on input of a said problem, executes a series of said queries in a sequence determined by the decision tree of said problem and by the answers to said queries, said diagnostics engine displaying said queries on a display of said central control unit, as well as prompting said operator to answer queries which require a manual input.

* * * * *